Patented July 28, 1942

2,290,860

UNITED STATES PATENT OFFICE 2,290,860

BENEFICIATION OF LUBRICATING OILS

Robert E. Burk and Everett C. Hughes, Cleveland Heights, Ohio, assignors to The Standard Oil Company, Cleveland, Ohio, a corporation of Ohio No Drawing. Application April 26, 1940, Serial No. 331,848

4 Claims. (Cl. 252—49)

Where a lubricating oil is subjected to drastic high temperature usage, as for instance in an internal combustion engine, it tends to change in viscosity and lubricating activity. The mechanism of the change is obscure and involves complex factors. By some writers the action has been ascribed to oxidation. However, the matter is not so simple as this, and the degradation can be brought about in the absence of oxygen. We have now found that by subjecting an oil to the action of certain material, the degradation tendency of the oil in drastic high temperature usage is arrested; and the lubricant as a whole is thus of outstanding advantage for severe high temperature usage.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with the invention, an oil of lubricating viscosity, high or low in accordance with the particular duty intended, and for instance being in general of 45 to 200 viscosity Saybolt Universal at 210° F., is subjected to the action of a small amount of a very active agent maintaining the oil against viscosity change in degradation change otherwise occurrent. The material for treating the oil is phosphorus, of the ordinary or yellow form, and it is effective in quantities of 0.001-0.25 per cent, greater amounts being unnecessary, and in particular we have found that amounts of 0.01-0.05 per cent are especially satisfactory. Peculiarly, we have found that if with the phosphorus we also include a methane base derivative there is a result out of all proportion to the mere additive action of the respective agents, and furthermore, there is no metal corrosion as might occur in some cases otherwise. The amount of the methane base derivative similarly can be small, for instance 0.001-5 per cent, and generally amounts less than 2 per cent are satisfactory. The methane base derivative is in general a compound of the general formula

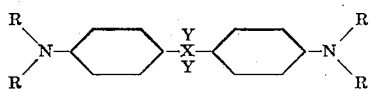

wherein R is hydrogen or a hydrocarbon group (e. g. alkyl, cycloparaffin, aryl, alkaryl, alkylidene, arylidene, acyl residue of carbonic and carbamic acid and their sulphur analogs, acyl of the sulfonic acid type, thiourea derivatives or reaction products of $CS_2$), X is carbon, nitrogen, sulphur, oxygen, phosphorus or other element, Y is hydrogen, oxygen, sulphur, halogen, alkyl, aryl, alkaryl, or their derivatives, or ketone or thioketone derivatives (i. e. oxime, hydrazone, semicarbazone, acetols) or imide. Where one Y is hydrogen, halogen, alkyl, aryl, or their derivatives or substitution products, the other Y may be for instance OH, SH, or their derivatives (as ethers, esters, aluminum and other alcoholates, phosphorus), $NH_2$ or H substituted derivatives thereof, $NHNH_2$, acylamines, semicarbazides, thiosemicarbazide, cyanide, cyanates, thiocyanates (iso and normal), carboxyl, thiocarboxyl, amide, xanthate, urea, thiourea, thio carbamates, sulfonic acid and its soaps, nitrosamine (where X is N). Where X is divalent, Y is absent correspondingly; and substituents such as alkyl, hydroxyl, additional amino, alkoxyl, and halogen, also may be present in the phenyl group. Illustrative of such compounds are:

Michler's hydrol and mercaptan
Michler's ketone and thioketone
Tetramethyl diamino diphenyl mono or dichloro methane
Auramine and leucoauramine
Aluminum tri-Michler's hydrolate
Michler's hydrol xanthate
Tetramethyl diamino diphenyl amine
Tetramethyl diamino diphenyl disulfide
Tetramethyl diamino diphenyl phosphine
Benzylidene diamino diphenyl methane Illustrative of the invention, the following examples may be noted:

I. In an oil of Pennsylvania stock, 20 S. A. E., there is incorporated 0.025 per cent of ordinary phosphorus, and 0.15 per cent of tetramethyldiaminodiphenylmethane. Whereas such oil without the phosphorus and metal corrosion inhibitor and run in a test at 300° F. for sixty-five hours shows a viscosity change from original 351 at 100° F. to 479 and a lacquer formation of 7.9 Mg, and appearance rating of C plus, the oil with the addition agents noted, on the same test shows a viscosity of only 396, and lacquer formation 1.3, and appearance rating B. If the metal corrosion inhibiting agent be left out, the oil with the phosphorus, on the same test, attacks metal to an impractical degree.

II. In a similar lubricating oil there is incorporated 0.025 per cent of ordinary phosphorus and 0.15 per cent of Michler's hydrol, and on a sixty-five hour test at 300° F., the viscosity changed only to 384, and the lacquer formation was 1.2 and the appearance rating B plus.

It was suggested many years ago, to add inactive or red phosphorus to transformer-filling oils with the idea of checking sludging. No measures were taken against metal corrosion. And, so far as we are aware it has not been known to treat oil with an active agent otherwise occasioning corrosion of metal surfaces, and at the same time guard such metal against untoward action.

Other modes of applying the principle of the invention may be employed, change being made as regards the details described, provided the features stated in any of the following claims, or the equivalent of such, be employed.

We therefore particularly point out and distinctly claim as our invention:

1. A lubricant comprising a mineral oil of lubricating viscosity, and a small amount of phosphorus and a small amount of tetramethyldiaminodiphenylmethane.

2. A lubricant comprising a mineral oil of lubricating viscosity, and a small amount of phosphorus and a small amount of tetramethyldiamino benzhydrol.

3. A lubricant comprising a mineral oil of lubricating viscosity, and a small amount of phosphorus and a small amount of Michler's thiohydrol.

4. A lubricant comprising a mineral oil of lubricating viscosity, and a small amount of phosphorus and a small amount of a derivative of diamino diphenyl methane.

ROBERT E. BURK.
EVERETT C. HUGHES.